May 31, 1966 B. H. KRYZER 3,253,713
WATER CONDITIONING SYSTEM
Filed June 4, 1962 4 Sheets-Sheet 1
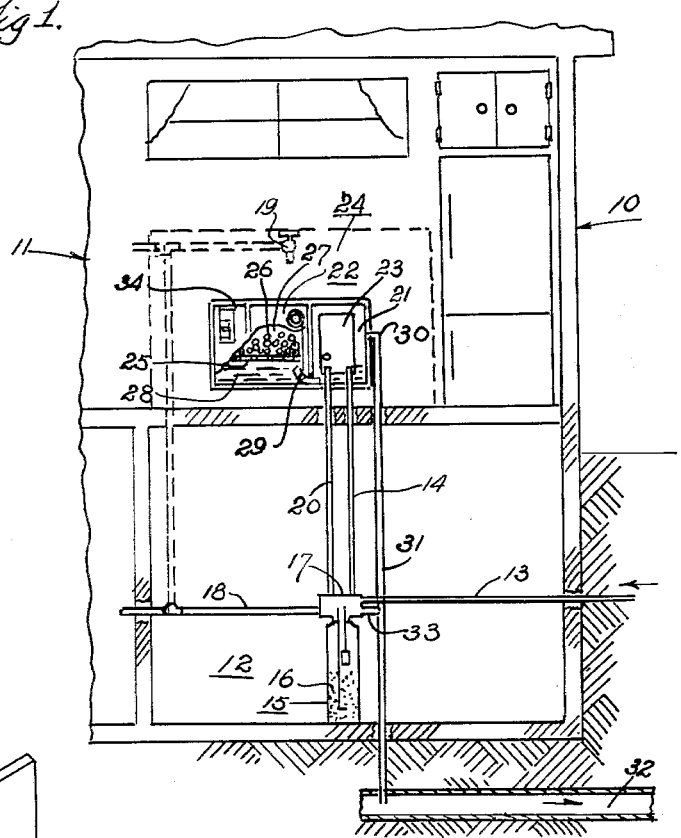
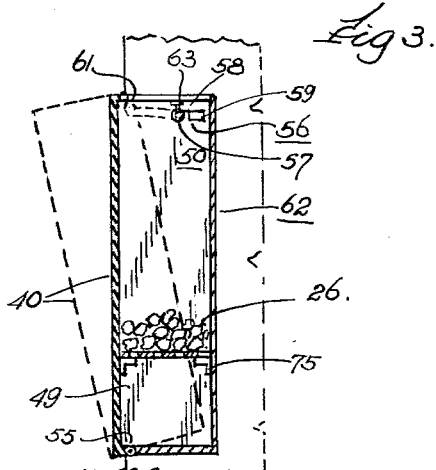
INVENTOR.
Benjamin H. Kryzer.
BY
Charles M. Kaplan
Attorney.

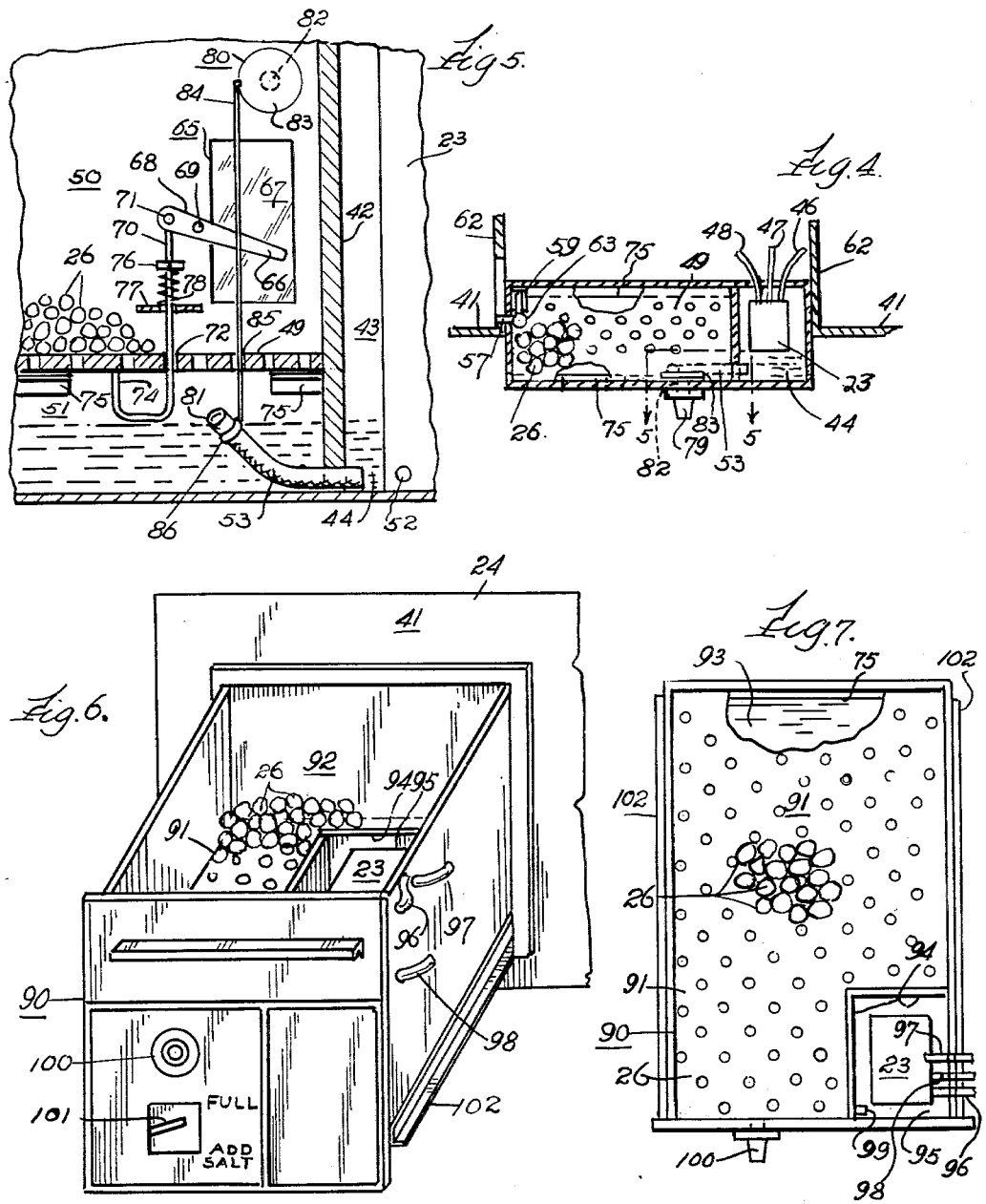

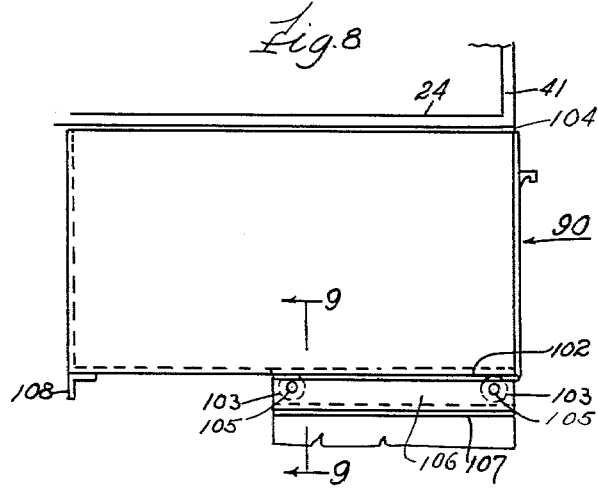
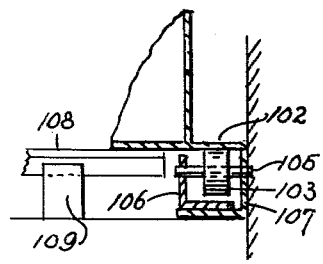
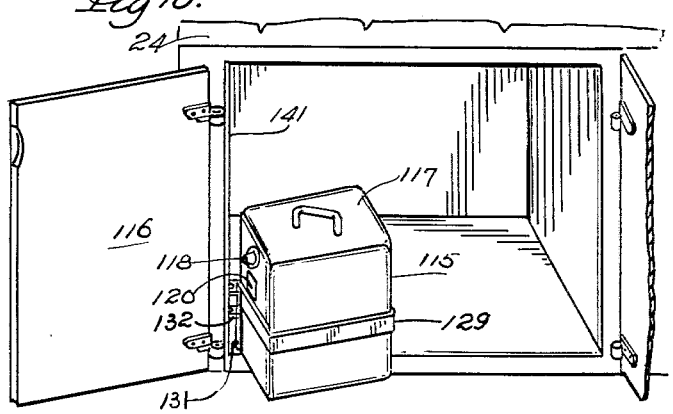
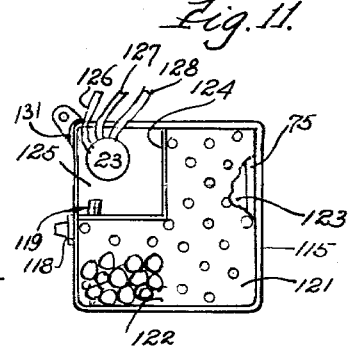
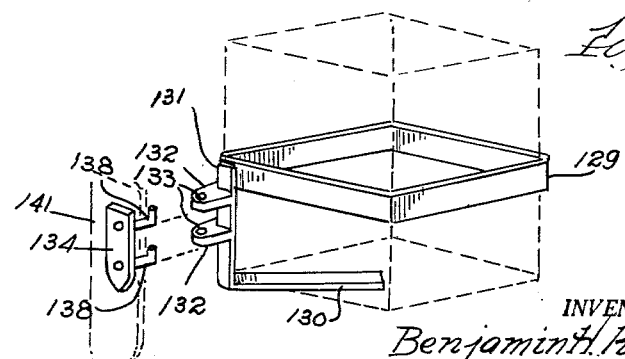

United States Patent Office 3,253,713
Patented May 31, 1966

3,253,713
WATER CONDITIONING SYSTEM
Benjamin H. Kryzer, St. Paul, Minn., assignor to Union Tank Car Company, a corporation of New Jersey
Filed June 4, 1962, Ser. No. 199,765
9 Claims. (Cl. 210—140)

This invention relates to water softeners, and more in particular to systems facilitating easy access and maintenance of such apparatus.

Conventional water conditioning or softening apparatus generally employ a bed of ion exchange material connected to an incoming supply of raw hard water for removing hardness or other undesirable properties. After a time, the hardness removing capacity of the bed is used up and must be regenerated before the system can function properly. Regeneration is ordinarily accomplished by passing a mineral solution, such as brine, through the bed, whereupon well-known chemical reactions take place to restore the hardness removing capacity of the bed. Thereafter, the bed is backwashed by flushing with water to remove the brine and reaction products, and also to remove clusters of solid material that may impede the flow of hard water during the softening cycle. The sequence and duration of the operations or cycles described above is ordinarily controlled by automatic valves of well-known types.

One problem associated with water conditioning systems of the above described type is replenishment at frequent intervals of the mineral that dissolves to provide the regenerating solution. If the mineral supply is not replenished, the softening bed will not be regenerated properly and the system will not remove hardness from water. When the regenerating solution is brine, replenishing the supply of mineral involves placing salt tablets or crystals in a container through which water flows to create the brine solution. This requires that someone observe the mineral level periodically to determine whether or not it needs replenishing, which in turn requires the person to make regular trips to the location where the regenerating mineral container is installed.

Prior art water softening systems were designed so that either the regenerating mineral container or both the regenerating mineral container and the softening bed were installed in an area of infrequent activity in a dwelling. The expression "area of infrequent activity" is defined as a zone which the usual routine of the occupants of the dwelling does not cause them to enter during their normal daily activities. For example, a furnace room, storage shed, and basement are zones or rooms that the usual routine of the occupants of a house does not cause them to enter as they go about their normal daily activities. This is to be contrasted with an "area of normal daily activity," which is defined as a zone or room in a dwelling that the usual daily routine of its occupants causes them to pass through or occupy frequently. For example, a kitchen, bathroom, and den are areas of normal daily activity in a house. It is intended that the term "dwelling" include commercial structures such as stores, restaurants, factories, and the like, as well as residential structures such as houses, apartments, hotels, and the like.

Thus, to observe and fill the regenerating mineral container in a prior art water softening system required an occupant of a dwelling to depart from his normal daily routine and enter a zone that he ordinarily would not enter. Consequently, replenishing of the regenerating mineral supply was often overlooked because the container was hidden away so that the occupant was not reminded to check the mineral supply frequently.

Location of the regenerating mineral container in an area of normal daily activity where it could be observed readily was not thought feasible in the past because the prior art containers were unattractive, cumbersome enclosures such as large cylindrical tanks that rested on the floor. Location of such an object in an area of normal daily activity, such as a kitchen or bathroom, was strongly objected to by dwelling occupants because it took up useful space and was unsightly. Consequently, the container was hidden away in the basement or some other area of infrequent activity where it was often forgotten, with the undesirable result discussed above. This banishment of the container from areas of normal daily activity also had the undesirable effect of depriving the dwelling occupants of the psychological benefits derived from pride of ownership achieved by displaying an attractive, useful appliance to guests and visitors.

Accordingly, it is an object of my invention to provide improved water conditioning systems which eliminate deficiencies of the prior art mentioned above.

Another object is to provide water softening systems with regenerating mineral containers which can be located in areas of normal daily activity without objection from dwelling occupants.

A further object is to provide water softening systems in which the regenerating mineral container will be observed by the occupants of a dwelling as they go about their normal daily routine, which will remind them to replenish the mineral supply when exhausted.

A further object is to provide water softening systems for dwellings in which the regenerating mineral container and the softening mineral bed are located in different areas, with the regenerating mineral container being located in an area of normal daily activity.

A further object is to provide regenerating mineral containers for water conditioning systems which are readily observable and easily accessible for replenishing the mineral supply.

Another object is to provide a water conditioning system having a regenerating mineral container observable in an area of normal daily activity in a dwelling so that the dwelling occupants can display the container to others without entering an area of infrequent activity.

Other objects and advantages of the invention will be apparent from the drawings, specification and claims, and the scope of the invention will be pointed out in the claims.

Briefly stated, according to one aspect of my invention, a water softening system is provided for a dwelling having an area of normal daily activity and an area of infrequent activity. The water softening means is the type that periodically requires a supply of regenerating fluid. Means are provided for storing a supply of the regenerating fluid. The storing means is located in the area of normal daily activity. This causes the storing means to be readily observable during the usual daily routine of the occupants of the dwelling so that they are reminded that it must contain a proper amount of regenerating mineral.

In the drawing:

FIGURE 1 is a schematic, partially cross sectional, elevational view of a dwelling having a water conditioning system in accord with my teachings.

FIGURE 2 is a perspective, partially broken away view of an embodiment of a regenerating mineral container for a water conditioning system in accord with my teachings.

FIGURE 3 is a cross sectional view taken along the line 3—3 in FIG. 2.

FIGURE 4 is a cross sectional view taken along the line 4—4 in FIG. 3.

FIG. 5 is an enlarged cross sectional view taken along the line 5—5 in FIG. 4.

FIGURE 6 is a perspective view of another embodiment of the invention.

FIGURE 7 is a partially broken away, top view of the container of FIG. 6.

FIGURE 8 is a side elevational view of the container of FIG. 6.

FIGURE 9 is an enlarged, cross sectional view of the roller mounting arrangement for the container of FIG. 6.

FIGURE 10 is a perspective view of another embodiment of the invention.

FIGURE 11 is a partially broken away, top view of the embodiment of FIG. 10, with the lid of the container removed.

FIGURE 12 is a schematic, perspective view showing the hinge mounting arrangement for the embodiment of FIG. 10.

Figure 13:
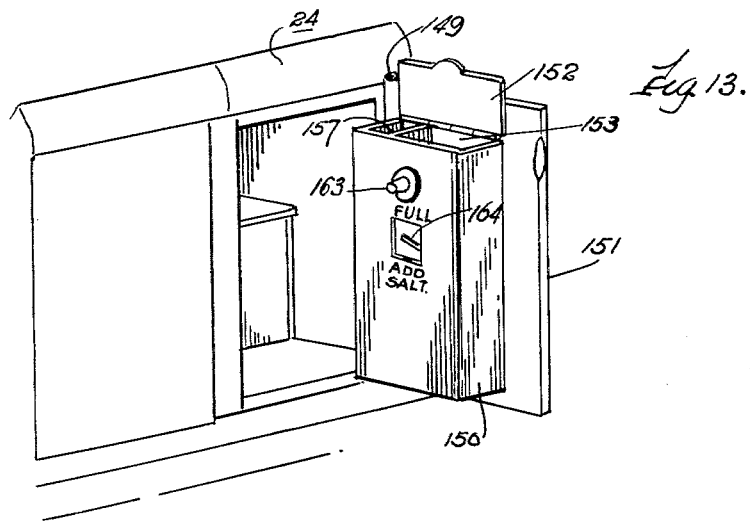
FIGURE 13 is a perspective view of a further embodiment of the invention.

Referring now to the drawing, FIG. 1 shows a house-type dwelling 10 having an area 11 of normal daily activity, and an area 12 of infrequent activity. The area 11 of normal daily activity is illustrated as a kitchen, it being understood, however, that other zones of the dwelling that are frequently entered by its occupants during their usual daily routine could be employed for the purposes of my invention. The area 12 is illustrated as a zone in the basement of the dwelling where a hard water supply pipe 13 enters through a side wall, it being understood that other areas of infrequent activity, such as a furnace room or an external tool shed would also serve the purposes of my invention.

Hard water entering through the pipe 13 is conditioned by water softening means 15 to remove hardness causing minerals therefrom. The softening means 15 may include a bed 16 of conventional water softening minerals, such as zeolite. The operating cycles of the softening means 15 may be controlled by a master valve 17, which, for example, may be the type disclosed in my United States Patent 3,215,273 assigned to the same assignee as this invention.

During the softening cycle, the master control valve 17 causes hard water from pipe 13 to flow through the bed 16 and then out through a soft water supply pipe 18 to various places in the dwelling where the water will be used, such as the kitchen sink tap 19. After the hard water has substantially exhausted the softening ability of the bed 16, a suitable timing mechanism associated with the valve 17 causes hard water to by-pass the bed 16 for use in the dwelling, while regeneration of the bed 16 takes place. During the regeneration cycle, hard water is diverted through a raw water inlet conduit 20 into a mixing compartment 21 in the liquid-tight regenerating mineral and liquid container means 22. This may be accomplished through use of fluid-drawing and flow-controlling means 23, such as a float-type aspirator valve of the disclosed in my United States Patent 3,185,302 assigned to the same assignee as this invention.

The container means 22 is located in the dwelling 10 in the area 11 of normal daily activity, as for example by mounting on a kitchen sink cabinet 24. The container means 22 may include a movable, perforated platform 25 for supporting solid regenerating mineral, such as salt tablets 26. Access to the interior of the container means 24 may be achieved by arrangements more fully described hereinafter with reference to FIGS. 2-14. The platform 25 defines an upper regenerating mineral compartment 27 into which water flows to dissolve the solid mineral to produce a concentrated regenerating liquor, which occupies a lower compartment 28. The means 23 causes the concentrated liquor to flow from the compartment 28 into the mixing compartment 21, where it is mixed with water from conduit 20 so as to produce the regenerating liquid, which flows through outlet conduit means 14 into the bed 16 and there regenerates the water softening minerals in a known manner. The container means 22 may contain means 29 for controlling the amount of concentrated regenerating liquor flowing into the compartment 21, as fully explained in paragraphs that follow. After a predetermined amount of regenerating liquid has flowed through the bed 16, the flow is increased to backwash the bed, and to replenish the liquid supply in the compartments 27 and 28.

The mixing chamber may include overflow conduit means 30 so that in case of malfunctioning of the apparatus, overflow into the area of normal daily activity will be prevented. The overflow conduit 30 is connected to a waste discharge line 31 which empties into the sewer line 32 from the dwelling. The control valve 17 also has a waste discharge line 33 emptying into the sewer 32 for discharge of the regenerating liquid and backwash flow.

The container means 22 may be provided with means 34 for visibly indicating the amount of regenerating mineral therein, in order to better alert the occupants of the dwelling when more mineral should be added.

FIGS. 2-5 illustrate in greater detail the features of an embodiment of a regenerating mineral container 40 for a water conditioning system in accord with my teachings. The container 40 is pivotally mounted on substantially vertical panel means 41, which may be the front of a kitchen sink cabinet, such as 24 in FIG. 1. As shown in FIGS. 2 and 4, and indicated in dotted lines in FIG. 3, the container 40 pivots outwardly from the panel means 41 so as to expose the open top thereof to facilitate filling with regenerating mineral 26. Partition means 42 defines a mixing chamber 43 where fluid-drawing and flow-controlling means 23, as previously described, is located. The means 23 is provided with a hard water inlet pipe 46, a regenerating liquid outlet pipe 47, and an overflow pipe 48, for the purposes described previously with reference to FIG. 1. A movable, perforated, substantially horizontal partition or platform 49 divides a portion of the container 40 into an upper regenerating mineral compartment 50, and a lower concentrated regenerating liquor compartment 51. Hard water entering through the inlet pipe 46 flows out of the means 23 through one or more openings 52 (see FIG. 5) and enters the compartment 51 through flexible tube 53, and then enters the compartment 50, where it dissolves the tablets 26.

Container 40 is pivotally attached to panel 41 by substantially horizontal hinge means 55 so as to expose the open top of the mineral compartment 50 for filling on pivoting the container in one direction beyond the panel 41 and so as to close off the compartment 50 from access on pivoting beyond the panel 41 in the opposite direction to a closed position shown in solid lines in FIG. 3. Latch means 56 may be provided for limiting the forward and backward tilting motion of the container 40. The latch means 56 comprises a pin 57 extending through an oversized hole in a side of the container 40. The pin 57 is attached to a leaf spring 58 mounted on an abutment 59 on the side of the container. An arcuate slot 60, having an upwardly extending portion 61, is provided in a side wall 62 of the cabinet 24, and the pin 57 extends into the slot 60. Thus, inward pivoting of the container 40 to the closed position is limited by one end of the slot, as shown in FIG. 3, and outward pivoting of the container to the open position is limited by the portion 61, as shown in FIG. 2. When the container 40 is pivoted to the open position, the leaf spring 58 will force the pin 57 upwardly into the portion 61 to latch the container in place while mineral tablets are being loaded into the compartment 50. To pivot the container to its closed position, a finger knob 63 attached to the pin 57 is depressed and the container pivoted past the panel 41 into the cabinet.

Means 65 may be provided on the exterior of container 40 for giving a visible indication of the quantity of solid mineral in the container. As shown in FIG. 2, the indicating means 65 comprises a pointer 66 visible through an opening in the front of the container covered by a transparent plate 67. Suitable notation may be provided for indicating when the container is full of regenerating mineral and when mineral is needed. As shown in greater detail in FIG. 5, the pointer 66 is pivoted about a point 69, so as to define an actuating arm portion 68. A rod 70, attached at 71 to the arm 68, extends downwardly through an opening 72 in the platform 49. A platform contacting extension 74 of the rod 70 engages the underside of the front edge of the platform 49 so as to lift same above its supporting channels 75. An abutment 76 is secured to the rod 70, and a bracket 77 having a hole therethrough is attached to the front wall of the container 40. A coil compression spring 78 is provided between the abutment 76 and bracket 77 for drawing the arm 70 upwardly. Thus, the indicating means 65 operates in the fashion of a spring scale in that the weight of the mineral tablets 26 on the platform 49 forces the rod 70 downwardly against the force of the spring 78 and thus pivots the pointer 66 upwardly. As the tablets 26 are dissolved, the force of the spring 78 against the abutment 76 draws the rod 70 upwardly and with it the platform 49. This causes the pointer 66 to move downwardly so as to indicate that the tablets are being dissolved. The spring 78 should be calibrated to indicate the amount of mineral needed for any particular application.

The container 40 may be provided with means 80 for controlling the quantity of concentrated liquor flowing into the mixing compartment 43 from the compartment 51. When the fluid-drawing and flow-controlling means 23 is of the type disclosed in my aforementioned United States Patent 3,185,302, the means 80 may be substituted for the manually operable control device for adjusting the quantity of regenerant withdrawn during the regenerating cycle, or the means 80 may be used as an additional control for regulating the quantity of regenerant used. Referring to FIG. 5, the flexible tube 53 extending through the partition 42 provides the only conduit for liquid flowing between the chambers 43 and 51. It is obvious that when the level of liquid in the chamber 51 falls below the upper end 81 of tube 53, it can no longer flow into the chamber 43. The height of the tube end 81 is controlled by turning the control knob 79 that protrudes from the exterior of the container 40. The control knob 79 is attached to a rotatable shaft 82 extending through the front wall of the container 40 and attached on the inside of said wall to a rotatable wheel 83. A flexible wire or strand 84 connects the wheel 83 to the tube end 81 by passing through a hole 85 in platform 49 and being attached to a band 86 secured to tube 53. Thus, it is obvious that rotation of the knob 79 will cause the strand 84 to be raised or lowered and this will control the height of tube end 81.

FIGS. 6–9 illustrate another embodiment of the invention in which the container means is in the form of a drawer 90 mounted for sliding movement beyond panel means 41 into and out of a cabinet 24. A movable, perforated platform 91 divides the drawer 90 into an upper regenerating mineral compartment 92 and a lower concentrated liquor compartment 93, and partition means 94 defines a mixing compartment 95 for the liquid-drawing and flow-controlling means 23, which is connected to a hard water inlet conduit pipe 96, a regenerating liquid outlet pipe 97, and an overflow pipe 98, as in the preceding embodiment. Liquid communication between the compartments 93 and 95 is provided by a flexible tube 99 controlled by a knob 100, as described for the embodiment of FIGS. 2–5. Similarly, an externally visible indicating pointer 101, actuated by a spring mechanism connected to the platform 91 in the manner described for the embodiment of FIGS. 2–5, may also be provided.

As shown in FIGS. 8 and 9, the drawer 90 may have its runners 102 supported by rollers 103 so that it is slidable into and out of an opening 104 in the panel 41 in order to provide or close off access to the compartment 92. The rollers 103 may be journaled in the bottom of the cabinet 24 on axles 105 mounted in suitable supporting brackets 106 and 107. Stop means 108 may be provided for engaging a protrusion 109 at the bottom of the cabinet to prevent pulling the drawer completely out of the cabinet.

FIGS. 10–12 show another embodiment of the invention in which the container 115 is mounted on panel 141 on the inside of cabinet 24. The container 115 is rotatable about a vertical axis so that it can be pivoted out of the cabinet 24 for filling with mineral and pivoted into the cabinet to permit closing of the door 116. A removable cover 117 may be provided for the container 115. A control knob 118 connected to a flexible tube 119, as described with reference to the preceding embodiments, may also be provided; and an externally visible indicator 120, actuated as described with reference to the preceding embodiments, may be provided. As shown in FIG. 11, the container 115 is divided by movable horizontal, perforated platform 121 into an upper regenerating mineral compartment 122 and lower concentrated liquor compartment 123. Partition means 124 define a mixing compartment 125 for fluid-drawing and flow-controlling means 23, which may be connected to a hard water inlet pipe 126, a regenerating liquid inlet pipe 127, and an overflow pipe 128, as described previously. The container 115 is circumscribed by a bracket 129 and supported thereneath by arm 130, both of which are attached to a vertical bracket 131 having ears 132 extending therefrom; the ears 132 having bearing openings 133 therein. A bracket 134 having upwardly extending bearing arms 138 for receiving the openings 133 is attached to the vertical panel 141 in the cabinet 24. This provides a substantially vertical hinge mounting arrangement permitting the container 115 to be pivoted into and out of the cabinet 24.

Figure 14:
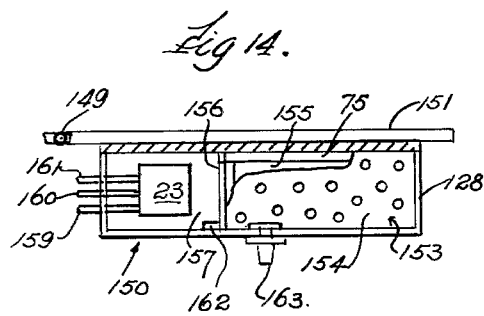
FIGURE 14 is a partially broken away, top view of the embodiment of FIG. 13.

FIGS. 13 and 14 show another embodiment of the invention in which a container 150 is mounted on the inside of a door 151 hinged at 149 so as to be movable into and out of a cabinet 24, which has vertical walls defining an enclosure for the container. Thus, opening of the door 151 exposes the mineral container 150 for access, while closing the door 151 prevents access to the container. The container 150 is provided with a hinged lid 152, permitting entry of an upper regenerating mineral compartment 153 defined by movable, perforated platform 154, which also defines thereneath a concentrated regenerating liquor compartment 155. A partition 156 defines a mixing chamber 157, which contains fluid-drawing and flow-controlling means 23 connected to a hard water inlet pipe 159, a regenerating liquid outlet pipe 160, and an overflow pipe 161, as described previously. Flow of regenerating liquor from compartment 155 to the mixing compartment 157 may be controlled through a flexible pipe 162 whose end is raised or lowered by turning a control knob 163 in the manner described with reference to FIGS. 2–5. A visible indication of the amount of undissolved mineral in the container 150 may be provided by a pivoted pointer 164 activated by a spring mechanism in the manner described previously with reference to FIGS. 2–5.

It is apparent that the respective container embodiments of FIGS. 2–5, 6–9, 10–12, and 13–14 are substantially identical in function and operation, except for the manner in which they are supported and the manner in which access to their interior is attained. It is also apparent that each of these embodiments can be employed in the system schematically illustrated in FIG. 1 by connecting their respective hard water inlet, regenerating liquid outlet, and overflow pipes to the conduits 20, 27, and 31. In all embodiments the hard water inlet, regenerating liquid outlet, and overflow pipes should be made from flexible materials such as rubber or plastic to permit bending or flexing thereof as the respective containers are moved to their open or closed positions. The containers themselves may be made from plastic or sheet metal covered with any suitable corrosion-preventing coating.

It has thus been shown that by the practice of my invention, regenerating mineral and liquid containers may be placed in easily accessible locations in areas of normal daily activity, without the objectionable drawbacks of containers employed in prior art water conditioning systems. Easy access to the regenerating mineral compartments has been provided by the various mounting arrangements disclosed herein. By locating the regenerating mineral containers in areas of normal daily activity, the occupants of a dwelling are constantly reminded that the regenerating mineral supply must not be allowed to expire. This overcomes the problems created by prior art systems wherein the addition of regenerating mineral was not always accomplished in sufficient time for regeneration of the water softening bed.

It will be understood, of course, that while the forms of the invention herein shown and described constitute preferred embodiments of the invention, it is not intended herein to illustrate all of the equivalent forms or ramifications thereof. If will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. In a water softening system for a dwelling the improvement comprising:
   I. water softening means periodically requiring a supply of regenerating liquid,
      (a) said water softening means being placed in a first location in said dwelling,
   II. a container for storing a replenishable supply of a regenerating mineral for dissolving to form said regenerating liquid,
      (a) said container being defined by exterior walls,
      (b) interior walls dividing said container into
         (1) a regenerating mineral compartment, and
         (2) a mixing compartment where concentrated regenerating liquor is diluted to provide said regenerating liquid,
      (c) means providing communication between said regenerating mineral compartment and said mixing compartment,
      (d) said mixing compartment having
         (1) flexible hard water inlet conduit means, and
         (2) flexible regenerating liquid outlet conduit means,
      (e) said container being placed in a second location in said dwelling spaced a substantial distance from said first location,
      (f) means movably supporting said container above the floor of said dwelling, said supporting means comprising vertical panel means cooperating with means substantially enclosing said container, and said container being movable relative to said enclosing means, whereby said regenerating mineral compartment is exposed to provide access for replenishing said mineral,
   III. said flexible regenerating liquid outlet conduit means providing a flexible hydraulic connection between said container and said water softening means for supplying regenerating liquid thereto, and
   IV. means for controlling the quantity and time of flow of said regenerating liquid to said water softening means.

2. The invention defined in claim 1 wherein:
said enclosing means has an opening therein, and said container is in the form of a drawer slideable into and out of said opening so as to provide or close off access to its interior.

3. The invention defined in claim 1 wherein:
said vertical panel means has an opening therein, and said container is in the form of an open-topped drawer,
   (1) roller means having a substantially horizontal axis of rotation slidably supporting said container so that said drawer is movable into and out of said opening beyond said panel so as to provide or close off access to its interior, and
   (2) stop means preventing accidental complete removal of container.

4. The invention defined in claim 1 wherein:
means pivotally attaches said container to said supporting means so as to facilitate access to said mineral compartment on pivoting said container in one direction about a substantially vertical axis.

5. The invention defined in claim 1 wherein:
said cooperating enclosing means and supporting means comprise cabinet means comprising said vertical panel means, and substantially vertical hinge means pivotally attaching said container to said panel means so as to facilitate access to said mineral compartment for filling with mineral on pivoting of said container in one direction beyond said panel means out of said cabinet means.

6. The invention defined in claim 1 wherein:
said cooperating enclosing means and supporting means comprise cabinet means defined by substantially vertical panels,
   (1) one of said panels being pivotable about a vertical axis so as to open or close off access to the interior of said cabinet means, and
   (2) another of said panels defining a support surface for said container on the interior of said cabinet means,
vertical hinge means including a bracket circumferentially enclosing said container pivotally attaching said container to said one panel to facilitate access to said mineral compartment for filling with mineral on pivoting of said container about a vertical axis in one direction beyond said panel and out of cabinet means beyond said door when open and to permit closing of said door by pivoting said container into the interior of said cabinet means.

7. The invention defined in claim 1 wherein:
said enclosing means has an opening therein, and said supporting means being pivotable to open or close said opening so as to permit access to said mineral compartment for filling with mineral on pivoting of said supporting means in one direction to open said opening and so as to prevent access to said mineral compartment on pivoting said supporting means in the opposite direction to close said opening.

8. The invention defined in claim 1 wherein:
said supporting means is pivotable so as to expose said mineral compartment for access on pivoting said container in one direction and so as to prevent access to said mineral compartment on pivoting said container in the opposite direction.

9. The invention defined in claim 1 wherein:
said cooperating enclosing means and supporting means comprise cabinet means defined in part by a door pivotable about a vertical axis so as to open or close off the interior thereof,
   said container being attached to said door so that pivoting of said door to open said cabinet makes said container accessible for filling of said mineral compartment, while pivoting of said door to close said cabinet prevents access to said container.

References Cited by the Examiner

UNITED STATES PATENTS

| | | | |
|---|---|---|---|
| 468,046 | 2/1892 | Merritt | 220—18 |
| 1,660,835 | 2/1928 | Folds. | |
| 1,714,515 | 5/1929 | Middelboe. | |
| 1,744,493 | 1/1930 | Nix | 210—86 X |
| 1,816,213 | 7/1931 | Duke | 312—343 X |
| 1,998,517 | 4/1935 | Moore | 312—343 |
| 2,236,347 | 3/1941 | Stancliffe | 137—390 |
| 2,265,225 | 12/1941 | Clark | 210—139 X |
| 2,463,304 | 3/1949 | Pick. | |
| 2,767,139 | 10/1956 | Hagman | 210—191 X |
| 2,800,228 | 7/1957 | Spaulding. | |
| 2,855,944 | 10/1958 | Albin | 210—191 X |
| 2,980,281 | 4/1961 | Stewart | 220—18 |
| 3,006,376 | 10/1961 | Schulze et al. | 210—191 X |
| 3,058,816 | 10/1962 | Rudelick | 210—190 X |
| 3,073,674 | 1/1963 | Rudelick | 210—191 X |
| 3,089,508 | 5/1963 | Schulze et al. | 23—267 X |
| 3,146,788 | 8/1964 | Mahlstedt et al. | 210—191 X |

REUBEN FRIEDMAN, *Primary Examiner.*

HERBERT L. MARTIN, *Examiner.*

F. W. MEDLEY, R. A. CATALPA, *Assistant Examiners.*